United States Patent Office 2,744,907
Patented May 8, 1956

2,744,907

PRODUCTION OF HETEROCYCLIC SULFONYL CHLORIDES

Richard William Young, Riverside, Conn., assignor to American Cyanamid Company, New York, N. Y., a corporation of Maine No Drawing. Application January 27, 1954,
Serial No. 406,605

4 Claims. (Cl. 260—302)

This invention relates to a method for the manufacture of organic chemical compounds and more particularly it relates to a process for the preparation of substituted heterocyclic sulfonamides.

The object of this invention is to provide a process for the synthesis of certain heterocyclic sulfonamides which, utilizing easily available starting materials, produces the desired compounds in high yields and under conditions which facilitate separation of the desired reaction product from the reaction mixture.

In accordance with the present invention the desired substituted benzylmercapto compound is suspended in an aqueous acid solution and chlorine is passed through the mixture. The resulting sulfonyl chloride derivative is then converted to the corresponding sulfonamide upon treatment with ammonia in the form of liquid ammonia or ammonium hydroxide, diluted with water, filtered, and the solution acidified with a mineral acid such as hydrochloric acid.

The overall reaction may be represented as follows:

wherein R is a heterocyclic function selected from the group consisting of aryl thiadiazole, alkylamino thiadiazole, aryl thiazole, and aryl triazole radicals such as phenylthiadiazole, acetylaminothiadiazole, benzothiazole and p-chlorophenyltriazole.

The process of this invention is particularly advantageous for the preparation of substituted heterocyclic sulfonamides in that the neutral benzylmercapto derivatives, which are used as the starting products, are considerably easier to synthesize than the mercaptans. Of equal significance is the fact that the final products may be separated out in pure form with considerable ease and in high yields due to their solubility in alkali. The corresponding benzylmercaptans, being insoluble in alkali, are thus readily separated.

The process of this invention is useful in the preparation of sulfonamides which are beneficial in the treatment of edema caused by congestive heart failure due to their specific ability to inhibit the causative enzyme "carbonic anhydrase." The compound 2-acetylamino-1,3,4-thiadiazole-5-sulfonamide can be given as one example.

The reaction temperature during the conversion of the benzylmercaptan to the corresponding sulfonyl chloride is preferably maintained within the range of 0 to 15° C. Chlorine is added in a rapid stream until the reaction is complete and conversion to sulfonyl chloride has taken place. Although no particular time limit can be given for all reaction mixtures, a period of 15 minutes to 2 hours is considered sufficient.

Acetic acid is preferred as the medium for suspending the benzylmercaptan although other aqueous acids are equally useful for this purpose, such as for example hydrobromic and hydrochloric acids.

The utility of the process of this invention is illustrated by the following examples:

Example I

A suspension of 2-phenyl-5-benzylmercapto-1,3,4-thiadiazole in 100 cc. of 50% (by volume) of aqueous acetic acid was cooled in an ice-methanol bath while a rapid stream of chlorine was introduced for 30 minutes. The solid was filtered off, washed with water and pressed damp-dry. This solid sulfonyl chloride was added to 50 cc. of liquid ammonia. After spontaneous evaporation of the ammonia to 1 cc., 25 cc. of water was added. Acidification of the filtrate with hydrochloric acid, gave a tan solid which on recrystallization from 60% ethanol effected pure 2-phenyl-1,3,4-thiadiazole-5-sulfonamide, melting point 210–211° C.

Example II

A suspension of 0.50 gram of 2-acetylamino-5-benzylmercapto-1,3,4-thiadiazole was cooled to 0° C. and a rapid stream of chlorine was introduced for 30 minutes. The thick solution (slush of $Cl_2 \cdot 6H_2O$) was allowed to warm to about 10° C. and was filtered, the resulting solid being washed several times with small portions of cold water. The damp-dry sulfonyl chloride was added to 20 cc. of liquid ammonia and after spontaneous evaporation, the resulting solid was dissolved in 10 cc. of water and 5 drops of concentrated ammonium hydroxide. The solution was clarified by filtration, the filtrate being acidified with concentrated hydrochloric acid to give a colorless solid, 2-acetylamino - 1,3,4 - thiadiazole-5-sulfonamide, which on recrystallization from water, had a melting point of 268–270° C.

Example III

A suspension of 1.0 gram of 2-benylmercaptobenzothiazole in 10 cc. of 33% aqueous acetic acid was cooled in an ice bath while a rapid stream of chlorine was introduced for 30 minutes. After this time, the precipitate was filtered off and washed with cold water, but the intermediate sulfonyl chloride began to decompose on the funnel. The solid was rapidly placed into liquid ammonia and after isolation as in Examples I and II above, a yield of 12% of benzothiazole-2-sulfonamide, melting point 179–180° C. was obtained.

Example IV

A cooled suspension of 1.0 gram of 3-p-chlorophenyl-5-benzylmercapto-1,2,4-triazole in 10 cc. of 33% aqueous acetic acid was saturated with chlorine during 30 minutes. The resultant solid was filtered off, washed, and ammoniated as in previous examples. The yield of 3-p-chlorophenyl-1,2,4-triazole-5-sulfonamide, after recrystallization from water, was 58%, melting point 265–268° C.

I claim:

1. The process of oxidative cleavage of compounds of the formula:

wherein R is a heterocyclic function selected from the group consisting of aryl thiadiazole, alkylamino thiadiazole, aryl thiazole, and aryl triazole radicals which comprises suspending a compound of the above formula in an aqueous acid solution, and passing chlorine therethrough to form the corresponding sulfonyl chloride.

2. The process of preparing 2-phenyl-1,3,4-thiadiazole- 5-sulfonyl chloride which comprises suspending 2-phenyl-5-benzylmercapto-1,3,4-thiadiazole in an aqueous acid solution, and passing chlorine therethrough to form the corresponding sulfonyl chloride.

3. The process of preparing 2-acetylamino-1,3,4-thiadiazole-5-sulfonyl chloride which comprises suspending 2-acetylamino-5-benzylmercapto-1,3,4-thiadiazole in an aqueous acid solution, and passing chlorine therethrough to form the corresponding sulfonyl chloride.

4. The process of preparing 3-p-chlorophenyl-1,2,4-triazole-5-sulfonyl chloride which comprises suspending 3-p-chlorophenyl-5-benzylmercapto-1,2,4-triazole in an aqueous acid solution, and passing chlorine therethrough to form the corresponding sulfonyl chloride.

References Cited in the file of this patent

UNITED STATES PATENTS 2,554,816     Clapp et al. _____ May 29, 1951

FOREIGN PATENTS 502,319     Belgium _____ Apr. 30, 1951

OTHER REFERENCES

Baker et al.: JACS, vol. 68, pp. 2636–9 (1946).